United States Patent
Marriott

(10) Patent No.: US 10,370,617 B2
(45) Date of Patent: Aug. 6, 2019

(54) PROCESS FOR THE FRACTIONATION OF ESSENTIAL OILS

(71) Applicant: Sensient Flavors Ltd, Milton Keynes (GB)

(72) Inventor: Raymond Marriott, Northhamptonshire (GB)

(73) Assignee: SENSIENT FLAVORS LTD, Milton Keynes (GB)

( * ) Notice: Subject to any disclaimer, the term of this patent is extended or adjusted under 35 U.S.C. 154(b) by 0 days.

(21) Appl. No.: 15/513,353

(22) PCT Filed: Sep. 29, 2015

(86) PCT No.: PCT/EP2015/072454
§ 371 (c)(1),
(2) Date: Mar. 22, 2017

(87) PCT Pub. No.: WO2016/050783
PCT Pub. Date: Apr. 7, 2016

(65) Prior Publication Data
US 2017/0306262 A1 Oct. 26, 2017

(30) Foreign Application Priority Data

Oct. 2, 2014 (EP) .................................. 14187514

(51) Int. Cl.
*C11B 9/02* (2006.01)
*B01D 11/02* (2006.01)
(Continued)

(52) U.S. Cl.
CPC .............. *C11B 9/025* (2013.01); *A23L 27/11* (2016.08); *B01D 11/0203* (2013.01);
(Continued)

(58) Field of Classification Search
CPC ............. G01N 1/40; G01N 2001/4061; G01N 2030/009; G01N 30/6034; B01D 15/40;
(Continued)

(56) References Cited

U.S. PATENT DOCUMENTS 4,647,466 A * 3/1987 Japikse .................. A23L 27/13
426/387
4,693,905 A * 9/1987 Japikse .................. A23L 27/13
426/387
(Continued)

FOREIGN PATENT DOCUMENTS

EP 0511673 A1 11/1992
EP 1759751 A1 3/2007
(Continued)

OTHER PUBLICATIONS

International Search Report and Written Opinion of the International Searching Authority for International Application No. PCT/EP2015/072454, dated Jan. 28, 2016, 8 pages.

*Primary Examiner* — Hong T Yoo
(74) *Attorney, Agent, or Firm* — RatnerPrestia

(57) ABSTRACT

A method for modifying the composition of essential oils to be used as such or as ingredients for flavour and fragrance formulations, the process using carbon dioxide and suitable solvents in combination with specific supports; Flavours and fragrances containing ingredients produced by the method and applications using the flavours and fragrances.

7 Claims, 17 Drawing Sheets

(51) Int. Cl.
*A23L 27/10* (2016.01)
*B01D 11/04* (2006.01)

(52) U.S. Cl.
CPC ...... *B01D 11/0284* (2013.01); *B01D 11/0403* (2013.01); *C11B 9/022* (2013.01); *A23V 2002/00* (2013.01)

(58) Field of Classification Search
CPC ............ B01D 11/0288; B01D 11/0203; B01D 11/0407; B01D 2011/007; B01D 11/0284; B01D 11/0403; B01D 11/04; A23L 33/105; A23L 27/10; A23L 27/11; A23L 27/13; C12C 3/10; C12C 3/08; C11B 9/02

See application file for complete search history.

(56) References Cited

U.S. PATENT DOCUMENTS

| | | | | |
|---|---|---|---|---|
| 5,015,491 | A | * | 5/1991 | Westwood ................ C12C 3/12 426/600 |
| 5,061,502 | A | | 10/1991 | Cully et al. |
| 5,252,729 | A | * | 10/1993 | De Crosta .......... B01D 11/0203 536/6.3 |

FOREIGN PATENT DOCUMENTS

| | | |
|---|---|---|
| EP | 1818388 A1 | 8/2007 |
| GB | 2119399 A | 11/1983 |

\* cited by examiner

PROCESS FOR THE FRACTIONATION OF ESSENTIAL OILS

RELATED APPLICATION

This application is a U.S. National Phase Application of PCT International Application PCT/EP2015/072454, filed on Sep. 29, 2015, which claims priority to European Patent Application EP 14187514.6, filed on Oct. 2, 2014, each incorporated by reference herein.

FIELD OF THE INVENTION

This invention discloses a method for modifying the composition of essential oils to be used as such or as ingredients for flavour and fragrance formulations, said process using carbon dioxide and suitable solvents in combination with specific supports. It also covers the flavours and fragrances containing ingredients produced by said method and applications using said flavours and fragrances.

SUMMARY OF THE INVENTION

One aspect of the present invention uses liquid and/or supercritical carbon dioxide as solvent in the modification of essential oil.

Another aspect of the present invention is to prepare essential oil fractions with high solubility.

A further aspect of the present invention is to prepare essential oil fractions with improved purity with respect to those of the prior art.

Yet another aspect of the present invention is to produce essential oil fractions with excellent stability.

It is also an aspect of the present invention to prepare essential oil fractions having improved organoleptic quality.

It is another aspect of the present invention to provide a process with good sustainability.

It is a further aspect of the present invention to remove pesticides and/or allergens from the essential oils.

DETAILED DESCRIPTION OF THE INVENTION

Figure 1:
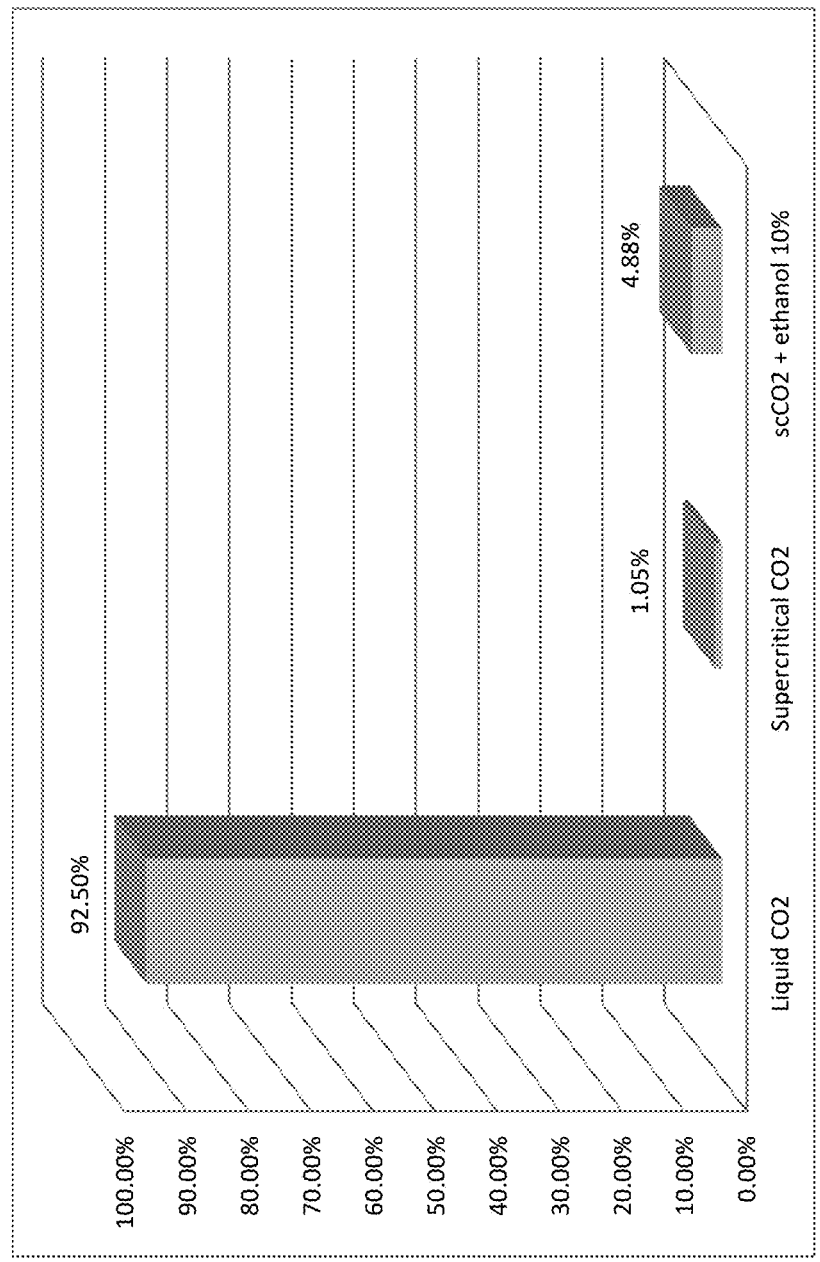
FIG. 1 represents the lemon oil yieds respectively with liquid carbon dioxide, with supercritical carbon dioxide and with a mixture of supercritical carbon dioxide and ethanol.

Accordingly, an aspect of the present invention discloses a sequential batch process with continuous solvent flow for modifying essential oil, said process being based on carbon dioxide solvents of increasing polarity in combination with specific support, and said process having high sustainability, in order to prepare environmentally friendly aroma products having a modified composition characterised by an improvement in any one or more of the following: improved water or oil solubility, improved stability, reduced level of unwanted contaminants such as pesticides, higher purity and improved organoleptic quality with respect to the prior art products.

The polarity of the carbon dioxide solvent increases with increasing temperature and/or pressure and/or addition of an increasing amount of co-solvent.

In a first embodiment according to the present invention, the modifying process of the present invention comprises the steps of:
a) providing a specific inert adsorbing support;
b) loading essential oil onto the support of step a) at a loading rate ranging between 1 and 70 mass %;
c) optionally separating a first fraction of essential oil with liquid or mildly supercritical carbon dioxide at a first temperature ranging between −10° C. and 50° C. and a first pressure ranging between 20 bars and 85 bars and a first flow rate ranging between 1 and 25% load/minute, until complete separation is achieved or the extract yield falls below 0.1% of starting mass per hour, and recovering said fraction;
d) optionally separating a second fraction with supercritical carbon dioxide at a second temperature of at least 31° C. and a second pressure of at least 72.8 bars and a second flow rate ranging between 1 and 25% load/minute until complete separation is achieved or the extract yield falls below 0.1% of starting mass per hour, and recovering said fraction;
e) optionally, continuing the separation process with supercritical carbon dioxide at another set of increasing temperature and/or pressure until all desired fractions are separated;
f) optionally separating a new fraction with supercritical carbon dioxide at a temperature of at least 31° C. and a pressure of at least 72.8 bars and a flow rate ranging between 1 and 25% load/minute combined with a co-solvent at a level ranging between 0.05 and 99.95% of the $CO_2$ flow rate, said co-solvent addition being either constant or gradually increasing, until complete separation is achieved or the extract yield falls below 0.1% of starting mass per hour, and recovering said fraction;
g) optionally, continuing the separation process with supercritical carbon dioxide at another set of increasing temperature and/or pressure and/or percentage of co-solvent until all desired fractions are separated;
h) soaking the support resulting from step f) or of step g) in an environmentally friendly solvent;
i) decanting or filtering the 'green' solvent from the support and subsequently evaporating or distilling said solvent;
j) optionally retrieving the remaining unseparated residues with the restriction that any two of steps c), d) and f) are present and said method being characterised in that the support is selected in terms of its volumetric capacity, its surface chemistry and its particle size, according to the nature of the essential oil to be modified.

In said process, steps c), d) and f) can all be present. Alternatively, the process can omit either step c) or step d) or step f), with any additional sub-steps in between as required.

In a preferred embodiment according to the present invention all steps c), d) and f) are present.

Step c) is preferably carried out with liquid carbon dioxide. If it is carried out with mild supercritical carbon dioxide, the temperature and/or pressure are lower than those of step d).

In step f), the amount of co-solvent can be added as a constant. Alternatively it can be added in progressively increasing amount, either as a gradient or stepwise.

The intermediate products are recovered by depressurisation.

In another embodiment according to the present invention, the process for modifying essential oil comprises the steps of:
a) providing a specific inert adsorbing support;
b) loading essential oil onto the support of step a) at a loading rate ranging between 1 and 70 mass %;
c) separating a first fraction of essential oil with liquid carbon dioxide at a first temperature ranging between −10° C. and 50° C. and a first pressure ranging between 20 bars and 85 bars and a first flow rate ranging between 1 and 25% load/minute until complete separation is achieved or the extract yield falls below 0.1% of starting mass per hour, and recovering said fraction;
d) optionally, continuing the separation process with liquid carbon dioxide at another set of increasing temperature and/or pressure with respect to step c) until all desired fractions are separated;
e) separating a new fraction with liquid carbon dioxide at a temperature ranging between −10° C. and 50° C. and a first pressure ranging between 20 bars and 85 bars and a flow rate ranging between 1 and 25% load/minute combined with a co-solvent at a level ranging between 0.05 and 99.95% of the $CO_2$ flow rate, said co-solvent addition being either constant or gradually increasing, until complete separation is achieved or the extract yield falls below 0.1% of starting mass per hour; and recovering said fraction;
f) optionally, continuing the separation process with liquid carbon dioxide at increasing set of temperature and/or pressure and/or percentage of co-solvent until all desired fractions are separated;
g) soaking the support resulting from step e) or of step f) in an environmentally friendly solvent;
h) decanting or filtering the 'green' solvent from the support and subsequently evaporating or distilling said solvent;
i) optionally retrieving the remaining unseparated residues said method being characterised in that the support is selected in terms of its volumetric capacity, its surface chemistry and its particle size, according to the nature of the essential oil to be modified.

The essential oils that can be used in this invention are not particularly limited and are those listed in International Organisation for Standardisation document ISO 4729:2009. They are preferably selected from but not limited to the Abietaceae, Acoraceae, Annonaceae, Apiaceae, Araceae, Asteraceae, Betulaceae, Burseraceae, Cistaceae, Compositeae, Cupressaceae, Ericaceae, Fabaceae, Geraniaceae, Graminae, Labiatae, Lamiaceae, Lauraceae, Lilliceae, Malvaceae, Myrataceae, Myristicaceae, Myrtaveae, Olaceae, Orchidaceae, Pinaceae, Piperaceae, Poaceae, Rosaceae, Rubiaceae, Rutaceae, Santalaceae, Styracaceae, Umbilliferae, Valerianaceae, Verbenaceae and Zingiberaceae families.

More preferably, they are selected from Apiaceae, Asteraceae, Lamiaceae, Myristicaceae, or Rutaceae The starting essential oil material is obtained from commercial suppliers or extracted from a suitable source material. As it varies in flavour content, it needs to be profiled. The chemical composition is known to vary from one essential oil to another according to the variety selected.

The inert adsorbing supports that can be used in the present invention can be either neutral, or basic or acidic and can be selected from any support material known in the art, but they must be inert towards the components of essential oil, have an affinity towards at least one of the materials or groups thereof that are being separated from each other and have the specific volumetric capacity, surface chemistry and particle size required by the nature of the essential oil. They can for example be glass beads, but preferably they have a large surface area and therefore are provided in a finely grinded form or in a porous form.

The support can be selected from any porous material. It is typically selected from silica, alumina, montmonrillionite, magnesium silicate, aluminium silicate, zeolite, polystyrene beads, chitosan, polysaccharides or derivatives and/or combinations thereof. Suitable support material can for example be selected from Celite S®, Celite 110®, Celite 209®, Celite 281®, Celite 503®, Celite 512M®, Celite 545®, Celite 545AW®, Celite 560®, Celite 577F®, Celite 535® all produced by Celite Corp., acid Alumina (Alumina A), basic Alumina (Alumina B), neutral Alumina (Alumina N), Ascarite® and Florisil® both produced by Sigma-Aldrich, Bentonite, Kaolinite, Fuller's Earth, produced by Sigma-Aldrich.

Preferably the porous support material has the following typical properties;
- a pore volume ranging between 0.2 and 1 $cm^3/g$;
- specific surface area is not particularly limited, it typically ranges between 50 to 1000 $m^2/g$; and
- an average particle size ranging from 5 nm to 10 mm;
- a pH ranging between 3 and 11; and
- a density ranging between 100 and 1500 g/l.

Preferably they have low water content ranging from anhydrous to at most 4 vol % water or they can be calcined as appropriate.

The nature of the support has an influence on the ability to extract pesticides from the essential oil. It is known that pesticides have a wide range of polar groups containing for example nitrogen, phosphorous and heteroatoms groups. The support must be selected in order to bind these groups thereby removing them from essential oil.

The surface chemistry, porosity and particle size are selected according to the nature of the essential oil to be modified in order to achieve maximum efficiency. The nature of the support has an influence on the binding strength between support and adsorbed material. It can be complex such as celite or bentonite and have little binding strength. Alternatively it can be an acidic or neutral or basic alumina and offer strong binding. The support is thus selected or tailored according to the desired level of separation or according to the nature of the material to be separated. It is observed for example, that moving from neutral to acidic alumina support results in a shift in fraction distribution towards more polar fractions and greater support interaction.

The support is loaded with essential oil at a loading rate ranging between 1 and 70 mass %, preferably between 1 and 30 mass %, and more preferably between 5 and 20 mass %.

The liquid or mildly supercritical carbon dioxide used in the first separation is preferably used at a temperature ranging between −10° C. and 50° C., and at a pressure ranging between 20 to 85 bars, with a preferred flow rate of 5 to 15 load/min and a period of time ranging between 45 minutes and 1 hour.

For the subsequent separations using liquid or mildly supercritical carbon dioxide, the temperature and pressure are selected to separate the desired aroma, using increasingly polar conditions or increasing temperature and/or pressure.

Above the supercritical point, the temperature and/or pressure are selected and adjusted to fractionate a wide range of molecules.

The supercritical carbon dioxide can further include a percentage of co-solvent. This increased the polarity of the solvent and leads to different separation products. The percentage of added co-solvent ranges between 0.05 and 99.95 vol %, preferably between 1 and 25 vol %, and more preferably between 5 and 15 vol %.

The environmentally friendly solvents that can be used in the present invention are selected from water or any organic food grade natural solvent, selected for example from ethanol, ethyl lactate, acetone, or from any combination thereof. The purity of solvents and carbon dioxide used in the present invention is 99.9% and it is food grade quality.

An important advantage of using supercritical carbon dioxide as fractionation and extraction solvent is that it can be easily removed because of its 'zero' surface tension, thereby producing solvent-free products.

Another advantage of the present invention is that it can selectively remove pesticides and allergens.

An aspect of the present invention also discloses the flavour and fragrance products obtained by the method of the present invention. They are characterised by any one or more of improved solubility in either oil or water, improved stability, improved purity and improved organoleptic quality with respect to those of the prior art.

Because the present flavour and fragrance products have been obtained with food grade solvents they do not suffer the disadvantage of containing traces of undesirable contamination. In addition, the pesticides are bound to the support material and have thus been substantially removed from the essential oil. Concerning unwanted compounds such as para-cymene and citral diethylacetal typically found in prior art flavour and fragrance products, they are produced by secondary chemical reactions caused by the elevated temperature and/or by the presence of acidic substances, necessitated by, or present in, the previous separation processes. As the temperature range of the present process is much lower than that of the prior art, said rearrangements are not favoured thereby producing flavours and fragrances substantially free of these undesirable compounds.

The liquid fractions prepared according to the present invention can either be used as such in food and beverage or transformed into flavour and fragrance products. Alternatively they can be transformed into powder form, and encapsulated. These powder capsules can be used directly or in flavour and fragrance products for food and perfumery industry.

The present invention further covers the products prepared with the flavour and fragrance products of the present invention.

EXAMPLES

Lemon oil, clove oil, peppermint oil and geranium oil were provided by Sensient Flavors Limited.

Silica support Davisil 60 was provided by W. Grace. It had a specific surface area (BET) of 550 $m^2/g$, an average particle size of 60 µm, a pore volume of 0.9 $cm^3/g$, a pH of 5.7 and a density of 720 g/l.

Alumina support Alumina UG-1 was provided by Altana. It had a specific surface area (BET) of 200 $m^2/g$, an average particle size of 60-80 µm, a pore volume of 0.25 $cm^3/g$, a pH of 9.5-10.5 and a density of 1000 g/l.

Liquid $CO_2$ was obtained from BOC.

The ethanol used was fermentation grade 96% ethanol obtained from Hawmans.

Extraction trials were carried out on a Thar extraction rig, using a 1000 ml extractor.

The support was prepared as follows: 10 wt % of mineral support loading for non-citrus oils such as geranium oil, peppermint oil or clove oil and 50 wt % loading of mineral support for citrus oils such as lemon oil. The oil was added slowly in a ribbon mixer containing the mineral support until the support has just reached saturation.

Extraction was then carried out as follows: the chillers were set at a temperature of 0° C. for the $CO_2$ pump and at a temperature of 0° C. for the cold trap. The packing density was 460 g/L for non-citrus oils and 600 g/L for citrus oils. The powder was fluidised using a long spatula to compact the charge and all powder was removed from the inner rim and threads before closing the extractor. The cylinder inlet pressure was set to a pressure of 50 bar using manual back pressure regulator (BPR) on $CO_2$ inlet line, the inline heater and extractor were switched off and the separator was heated to a temperature of 45° C. for liquid carbon dioxide extraction.

The first extraction was carried out with liquid $CO_2$ at a temperature of 5° C. and a pressure of 70 bar with a flow rate of 10 g/min for non-citrus oils and of 15 g/min for citrus oils. Once pressure had been reached, the separator was adjusted to 70 bar back pressure. When the last sample was collected, the cold trap was drained. After completion, the $CO_2$ pump was switched off, the separator back pressure was released and the separator and cold trap were washed with ethanol, washings were discarded. The lid was refitted and tightened after thorough drying In the subsequent extraction using Supercritical $CO_2$, the automated back pressure regulator (ABPR) was set to 300 bar and the extractor temperature was increased to 45° C. Once temperature was reached, $CO_2$ was turned on at a flow rate of 10 g/min for non-citrus oils and of 15 g/min for citrus oils and once the pressure had been reached, the separator fraction was collected. When complete the $CO_2$ pump was switched off, the back pressure was released and the separator was drained. The washings were discarded, trap volatiles were collected in a separate vial, then the trap was opened and washed out with ethanol and the washings were discarded. The trap and separator were reassembled.

The next extraction was carried out with supercritical $CO_2$ with ethanol as co-solvent. The co-solvent pump was primed, then the valve was slowly opened to allow pressure to equilibrate with supercritical $CO_2$ flow. ABPR setting was slowly reduced to 300 bar and the extractor temperature decreased to 45° C. Once temperature had been reached, $CO_2$ flow was turned on at a flow rate of 10 g/min for non citrus oils and of 15 g/min for citrus oils and the co-solvent pump was opened at a flow rate of 1 g/min for non-citrus oils and of 1.5 g/min for citrus oils of ethanol corresponding to 10 vol % of ethanol. The samples were collected and the separator and trap were drained into the same flask. The co-solvent pump was then turned off but the $CO_2$ pump was run for a while longer adding this to the last fraction.

At the end of the operation the plant was thoroughly cleaned as follows: the plant was depressurised and all heaters turned off. The contents of extractor were emptied into a plastic beaker and the extractor was cleaned with a vacuum cleaner. The trap and separator were cleaned with ethanol, and allowed to dry. The plant was then reassembled.

Identification of the compounds was based on calculated Kovats retention index, comparison with library mass spectra (NIST and Adams) and comparison with standard components.

Example 1

The silica support Davisil (from W. Grace) was loaded with 50 wt % of cold pressed lemon oil.

A 3-step sequential extraction of the lemon oil was carried out respectively with liquid $CO_2$, with supercritical $CO_2$ and with supercritical $CO_2$ mixed with 10 vol % of ethanol. Both the liquid $CO_2$ and supercritical $CO_2$ fractions consisted of terpene hydrocarbons. In the supercritical $CO_2$ fraction, a residual amount of sesquiterpene hydrocarbons was also present. The supercritical $CO_2$ mixed with 10 vol % ethanol fraction was distinctively different: it contained predominantly citral with no mono or sesquiterpene hydrocarbons present thereby producing a hydrocarbon terpeneless oil.

The yields in the various $CO_2$ separations can be seen in FIG. 1. The liquid $CO_2$ fraction is the main fraction and represents 92.50% of the starting oil. The terpeneless oil obtained with supercritical $CO_2$ mixed with 10 vol % ethanol represents about 4.9% of the starting oil.

Figure 2:
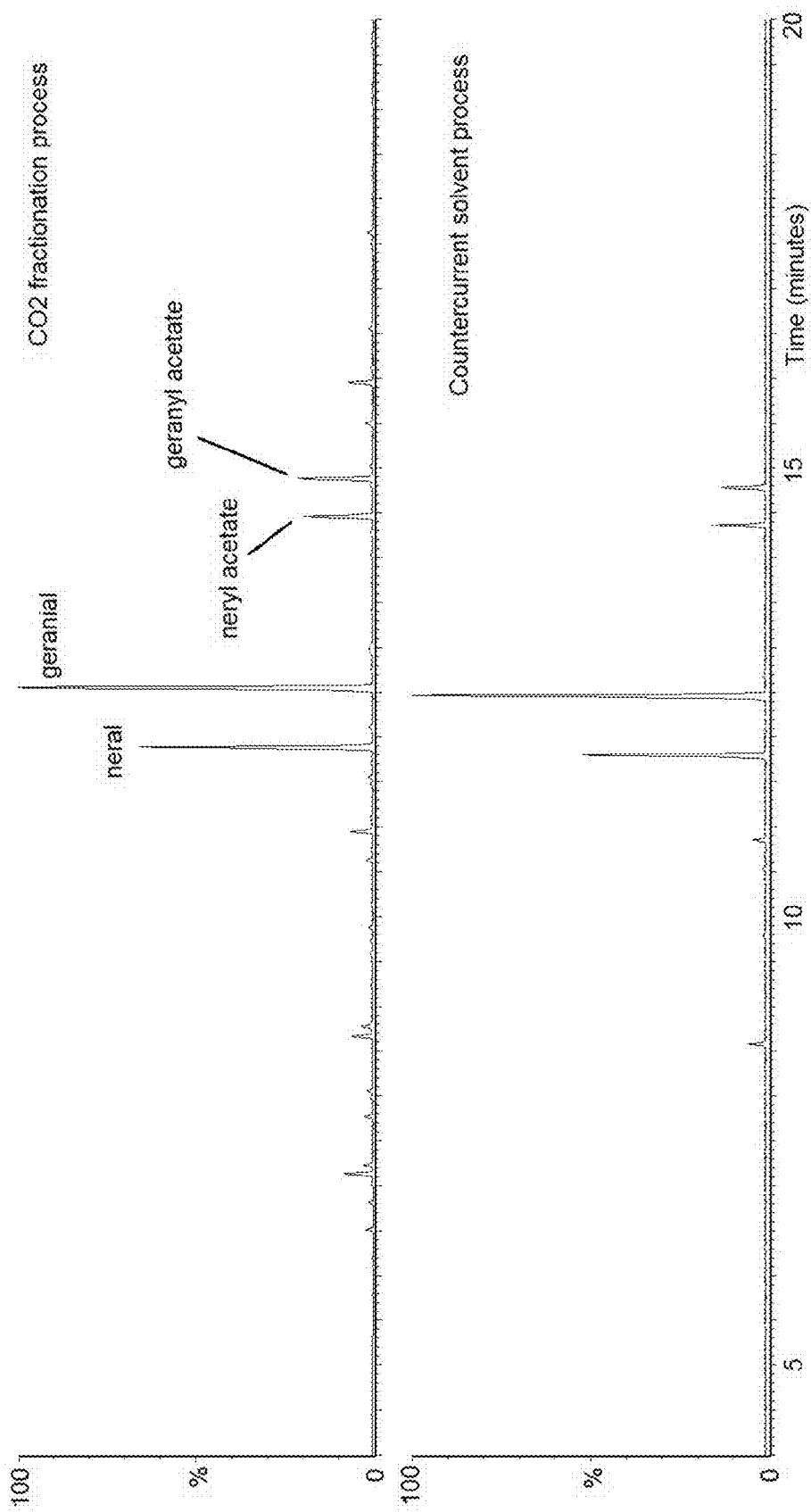
FIG. 2 represents the comparison between the carbon dioxide fractionation process and the countercurrent solvent process for TSS lemon oil.
Figure 3:
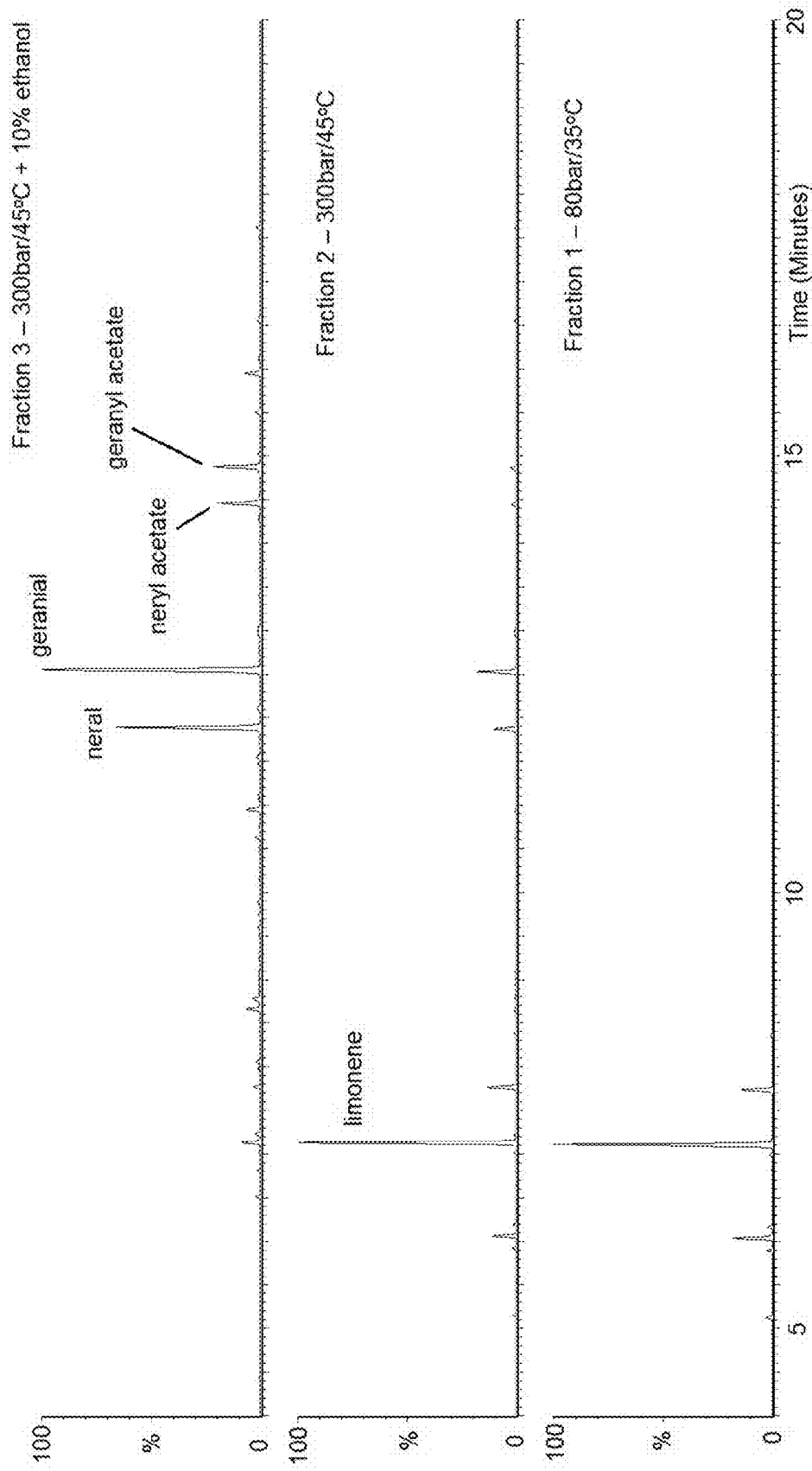
FIG. 3 represents the chromatograms of fractions 1, 2 and 3 of lemon oil obtained respectively with carbon dioxide at a pressure of 80 bars and a temperature of 35° C., carbon dioxide at a pressure of 300 bars and a temperature of 45° C. and carbon dioxide at a pressure of 300 bars and a temperature of 45° C. mixed with 10 vol % of ethanol.
Figure 4:
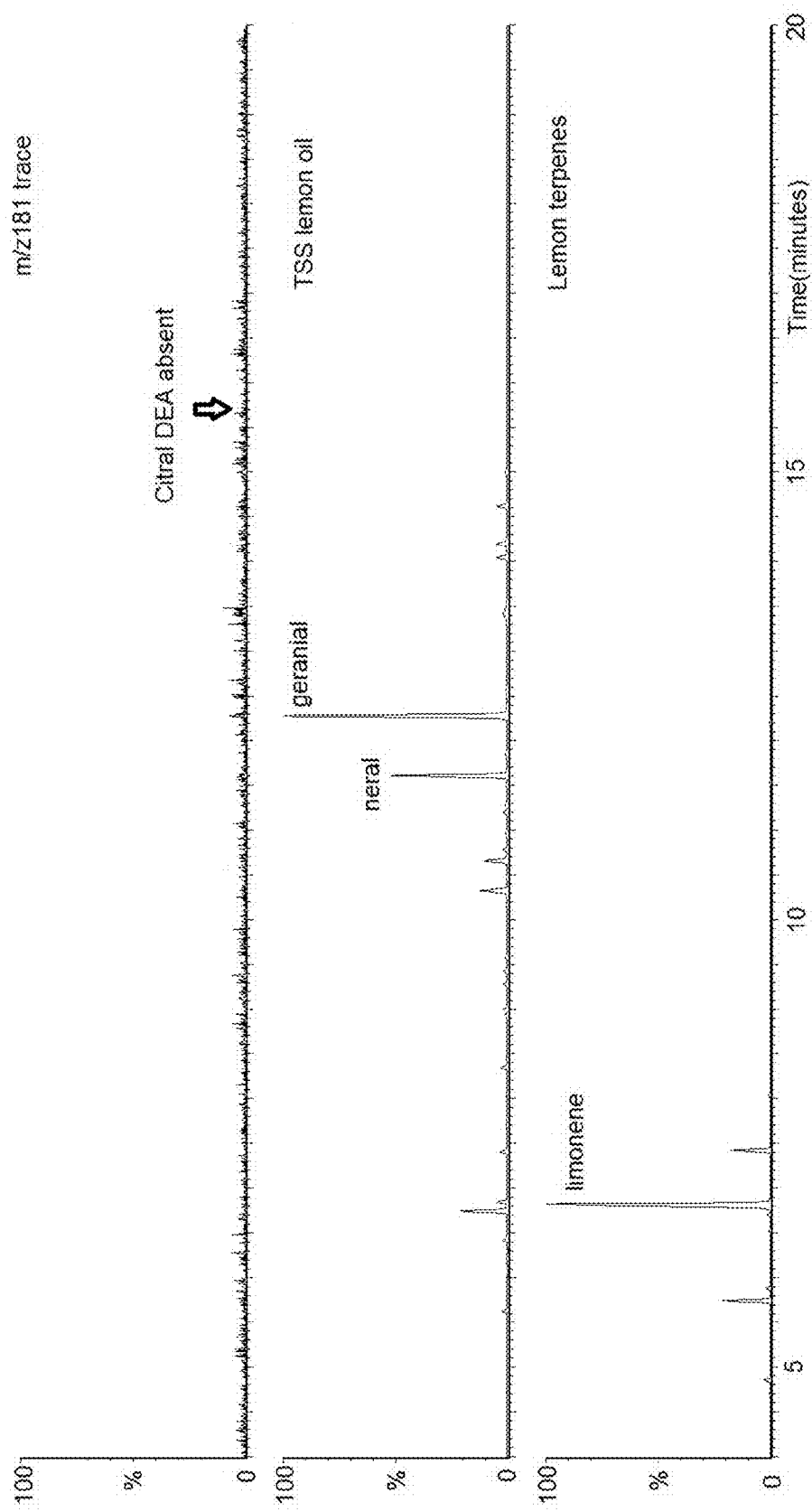
FIG. 4 represents the sequential process of the present invention wherein the terpeneless oil fraction was collected after 6 hours of exposure to ethanol, showing the absence citral diethyl acetate.
Figure 5:
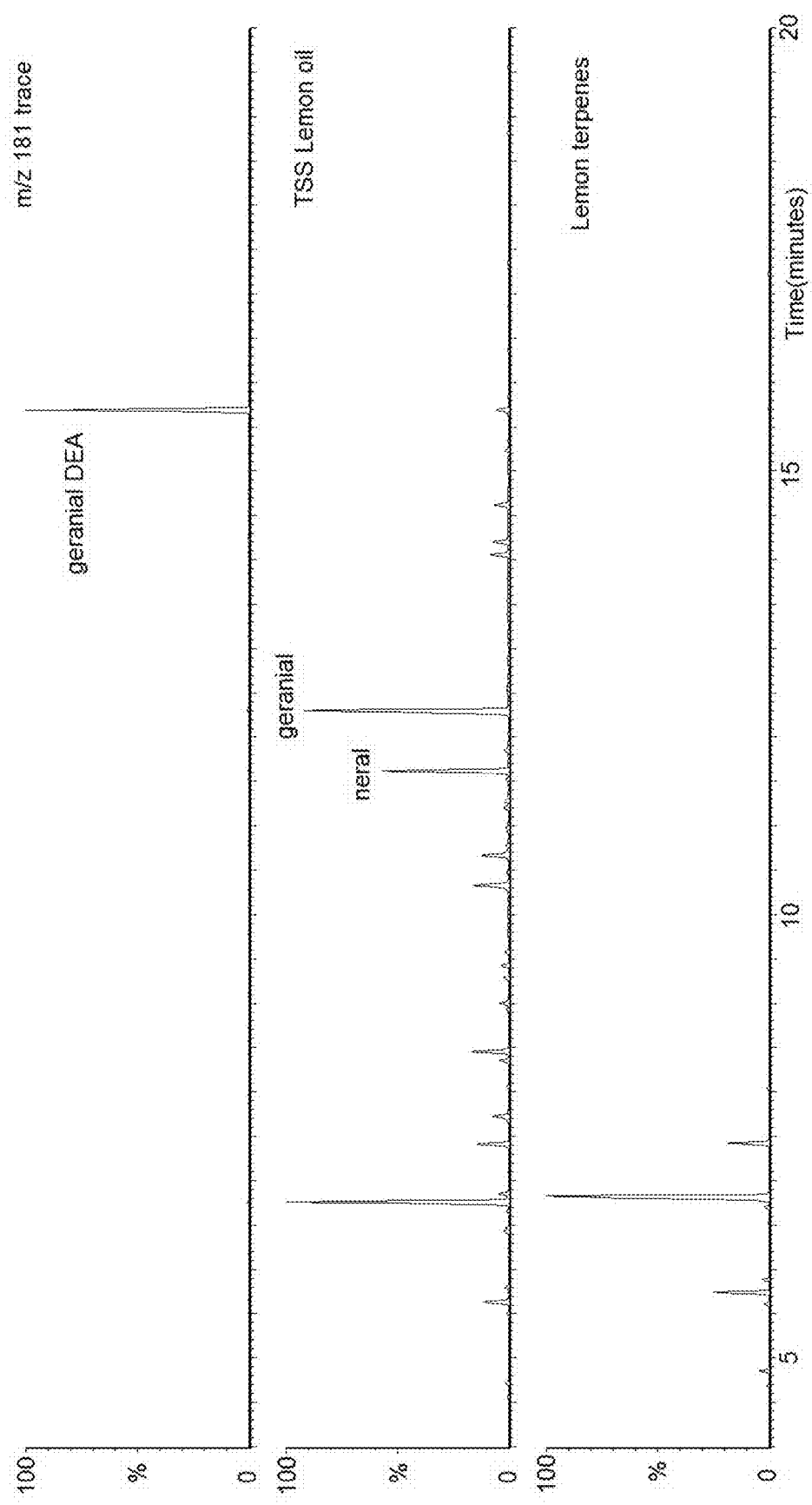
FIG. 5 the same sequential process except that the terpeneless oil fraction was collected after 24 hours of exposure to ethanol, showing the presence of citral diethyl acetate.
Figure 6:
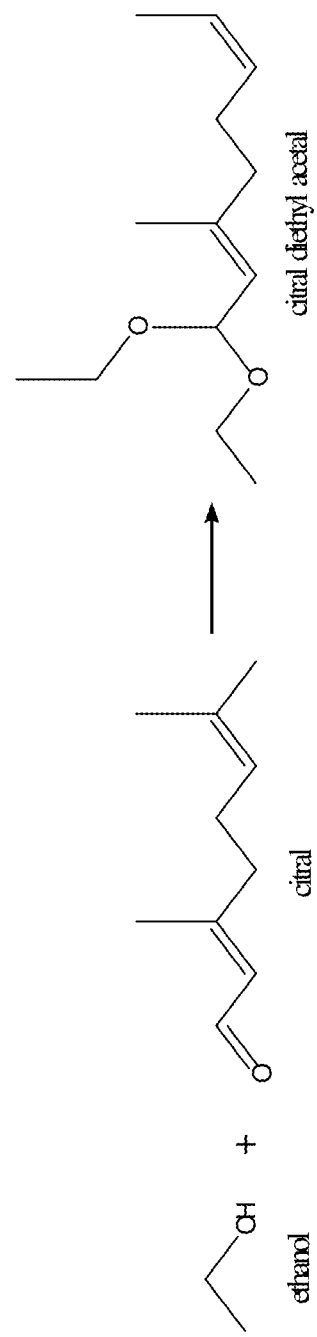
FIG. 6 represent the reaction occurring between ethanol and citral to form citral diethyl acetate.

FIG. 2 shows the chromatograms of terpeneless lemon oil obtained respectively from a $CO_2$ process and from a conventional industrial countercurrent process. The two processes produced a almost identical terpeneless oil, both analytically and organoleptically. Terpene hydrocarbons are removed to aid solubility and stability. Countercurrent process involves a range of solvents including hexane, ethanol and water. The contact of ethanol with lemon oil can sometimes generate the unwanted formation of diethyl acetals (DEA). This side reaction can be avoided by eliminating prolong exposure to ethanol at an elevated temperature. The formation of DEA has been studied in two trials. The first trial, represented in FIG. 3 shows a sequential extraction using two different supercritical $CO_2$ conditions, respectively a temperature of 35° C. and a pressure of 80 bars, and a temperature of 45° C. and a pressure of 300 bars, and an extraction with supercritical $CO_2$ at a temperature of 45° C. and a pressure of 300 bars mixed with 10 vol % of ethanol. The supercritical $CO_2$ with ethanol fractions consist of terpeneless oil. FIG. 4 shows a terpeneless oil, collected within 6 hours which did not exhibit the presence of DEA. In FIG. 5, the terpeneless oil remained in contact with ethanol for 24 hours. The chromatogram shows an additional peak related to the presence of citral DEA: it is formed as a side reaction with ethanol as explained in FIG. 6. Such unwanted reaction can be avoided by the continuous sequential processing of the present invention.

Example 2

The silica support Davisil was loaded with 10 wt % of clove oil.

A 2-step sequential extraction of the clove oil was carried out respectively with liquid $CO_2$ and supercritical $CO_2$.

Figure 7:
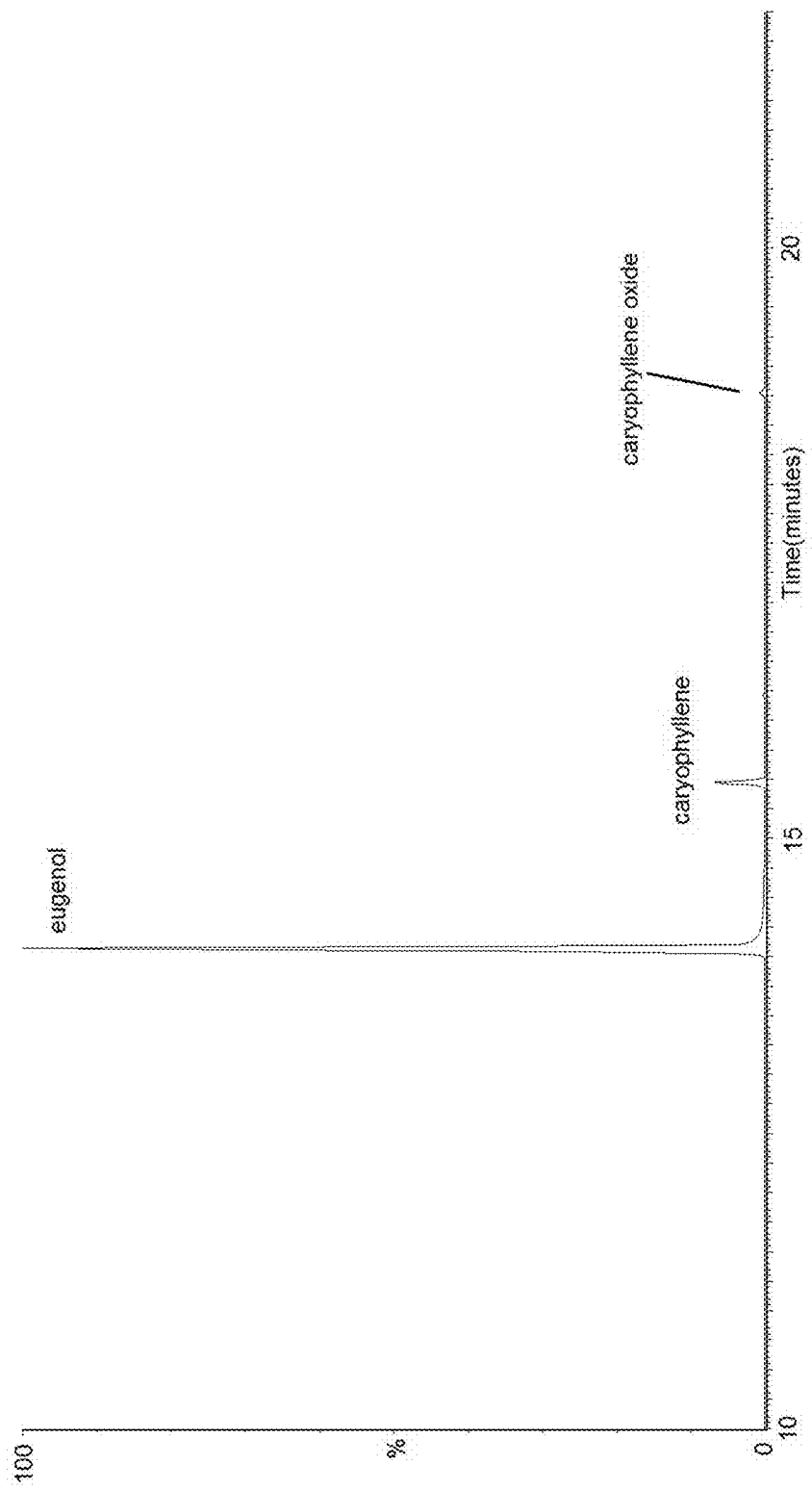
FIG. 7 represents the spectrum of clove oil GSL2066.
Figure 8:
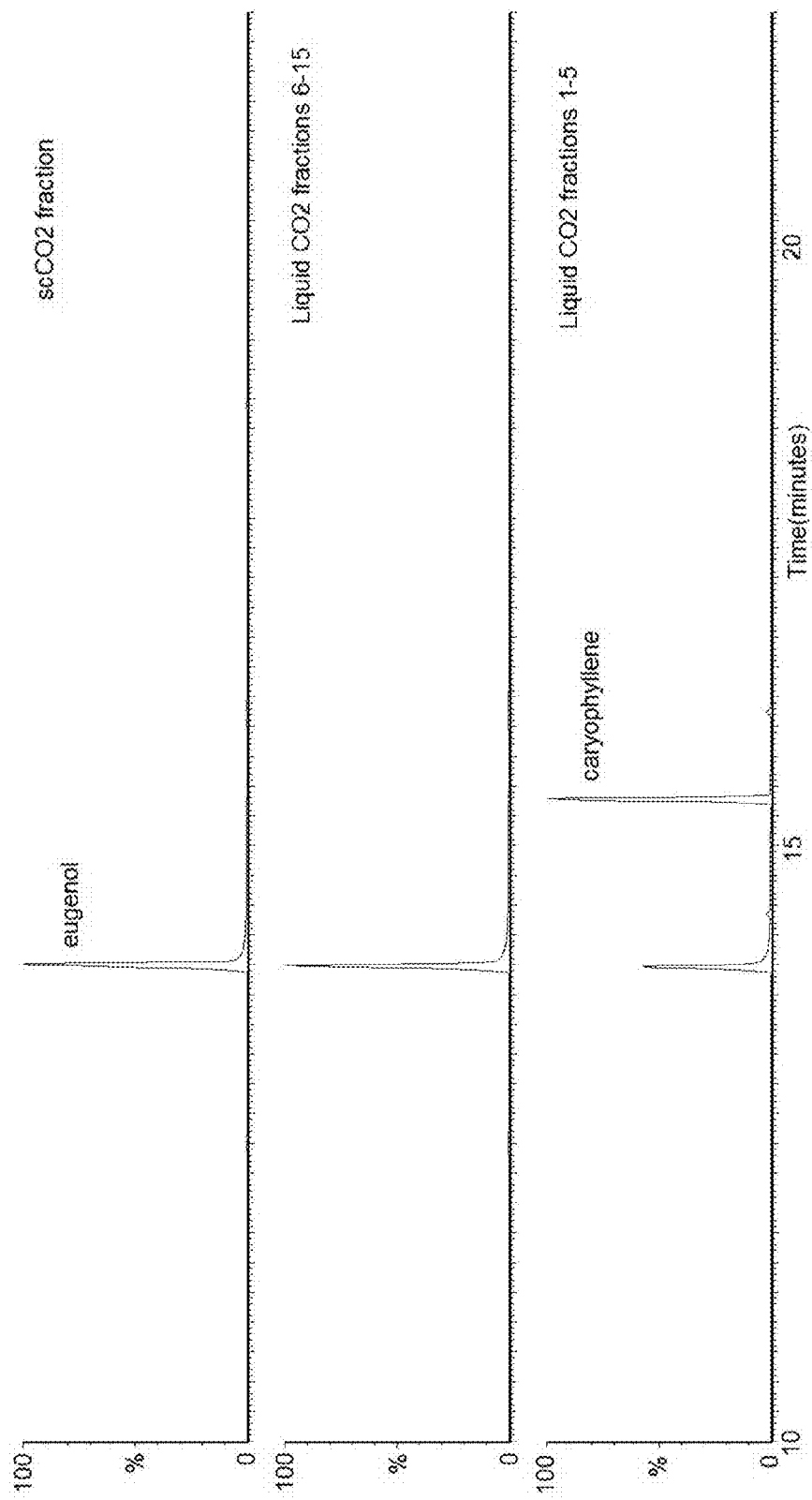
FIG. 8 represents the chromatograms of clove oil fractions wherein fractions 1 to 5 are obtained with liquid carbon dioxide at a pressure of 70 bar and a temperature of 5° C., fractions 6 to 15 are obtained with liquid carbon dioxide at a pressure of 70 bar and a temperature of 5° C., and the last fraction is obtained with supercritical carbon dioxide at a pressure of 300 bar and a temperature of 45° C.

The starting clove oil consisted mainly of eugenol, caryophyllene and caryophyllene oxide as can be seen in FIG. 7. The chromatograms shown in FIG. 8 give a clear separation of eugenol and caryophyllene.

Caryophyllene was separated using liquid $CO_2$. Eugenol was extracted with supercritical $CO_2$ as single component in the oil. The separation could further be extended to remove carophyllene oxide using supercritical $CO_2$ with ethanol. Almost all caryophyllene was removed in the first 2 hours of the sequential extraction.

Figure 9:
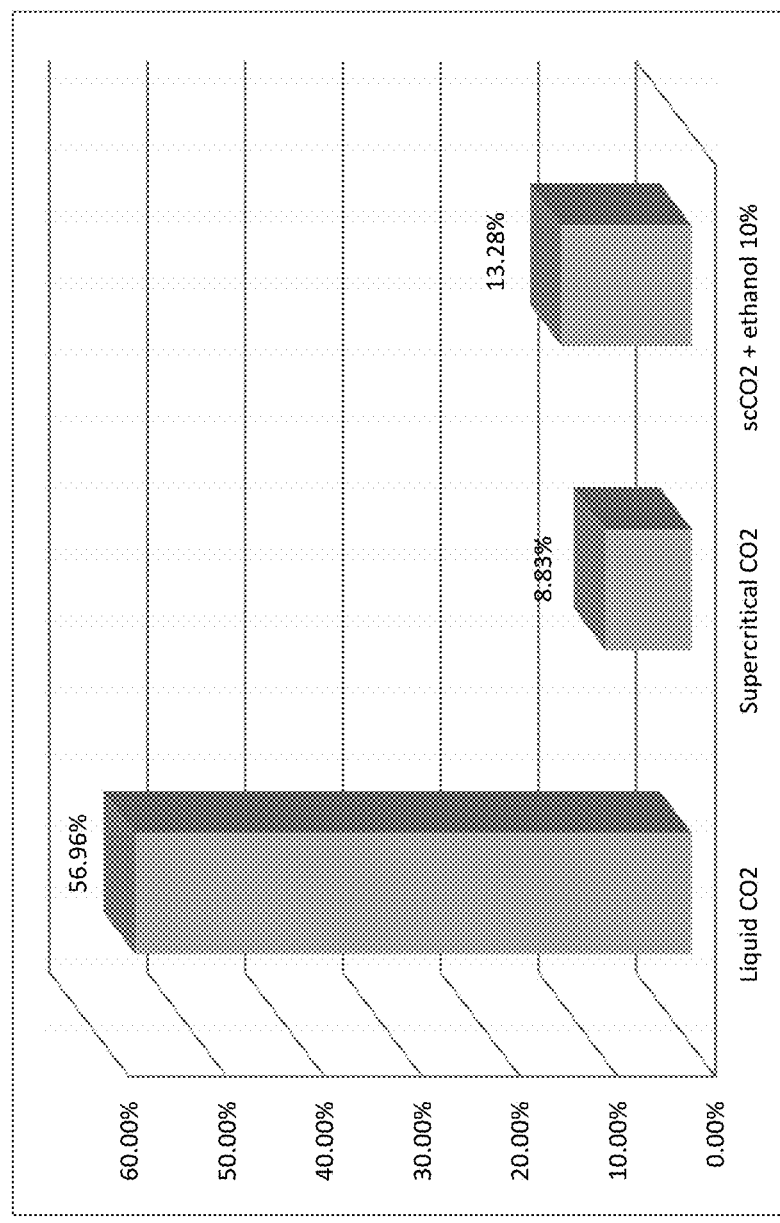
FIG. 9 represents the clove oil yields respectively with liquid carbon dioxide, with supercritical carbon dioxide and with a mixture of supercritical carbon dioxide and ethanol.

The yields obtained respectively with liquid $CO_2$, supercritical $CO_2$ and supercritical $CO_2$ mixed with ethanol are represented in FIG. 9.

The starting oil, liquid $CO_2$ and supercritical $CO_2$ fractions all had distinctly different flavour and aroma but the supercritical $CO_2$ fraction was more similar to the starting oil than the liquid CO2 fraction. The liquid $CO_2$ fraction was harsh, woody, spicy and clove-like whereas the supercritical $CO_2$ fraction was woody, floral, spicy, fresh and typical of clove.

Example 3

Figure 10:
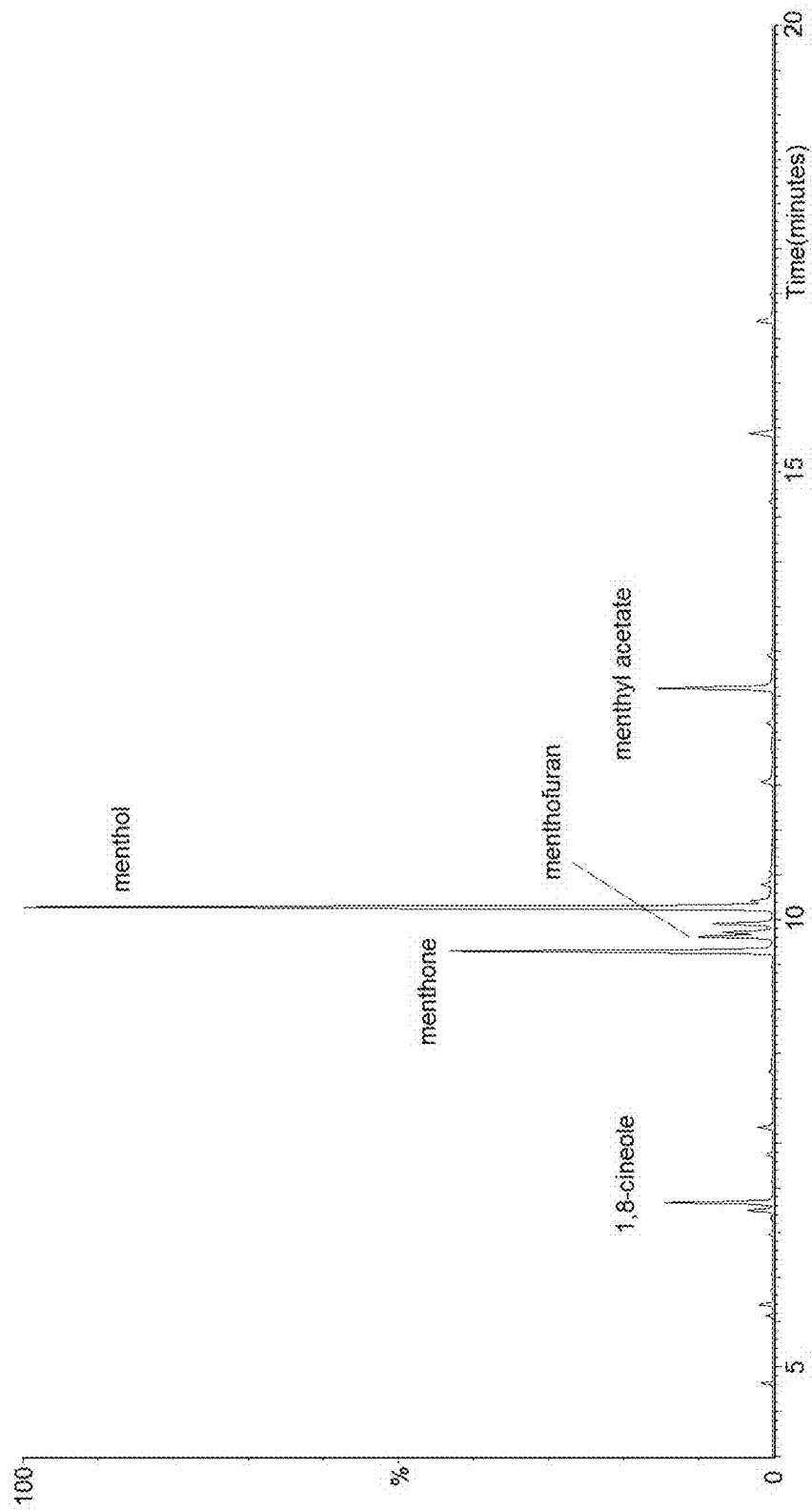
FIG. 10 represents the spectrum of peppermint oil RM3039.

The silica support Davisil was loaded with 10 wt % of peppermint oil. The chemical composition of the starting peppermint oil can be seen in FIG. 10: it consists mainly of menthone, menthol and methyl acetate.

Menthofuran is a common molecule found in peppermint oil. It is listed as a Biologically Active Principles (BAPs) under EC 1334/2008 and has restrictive use in food applications.

Figure 11:
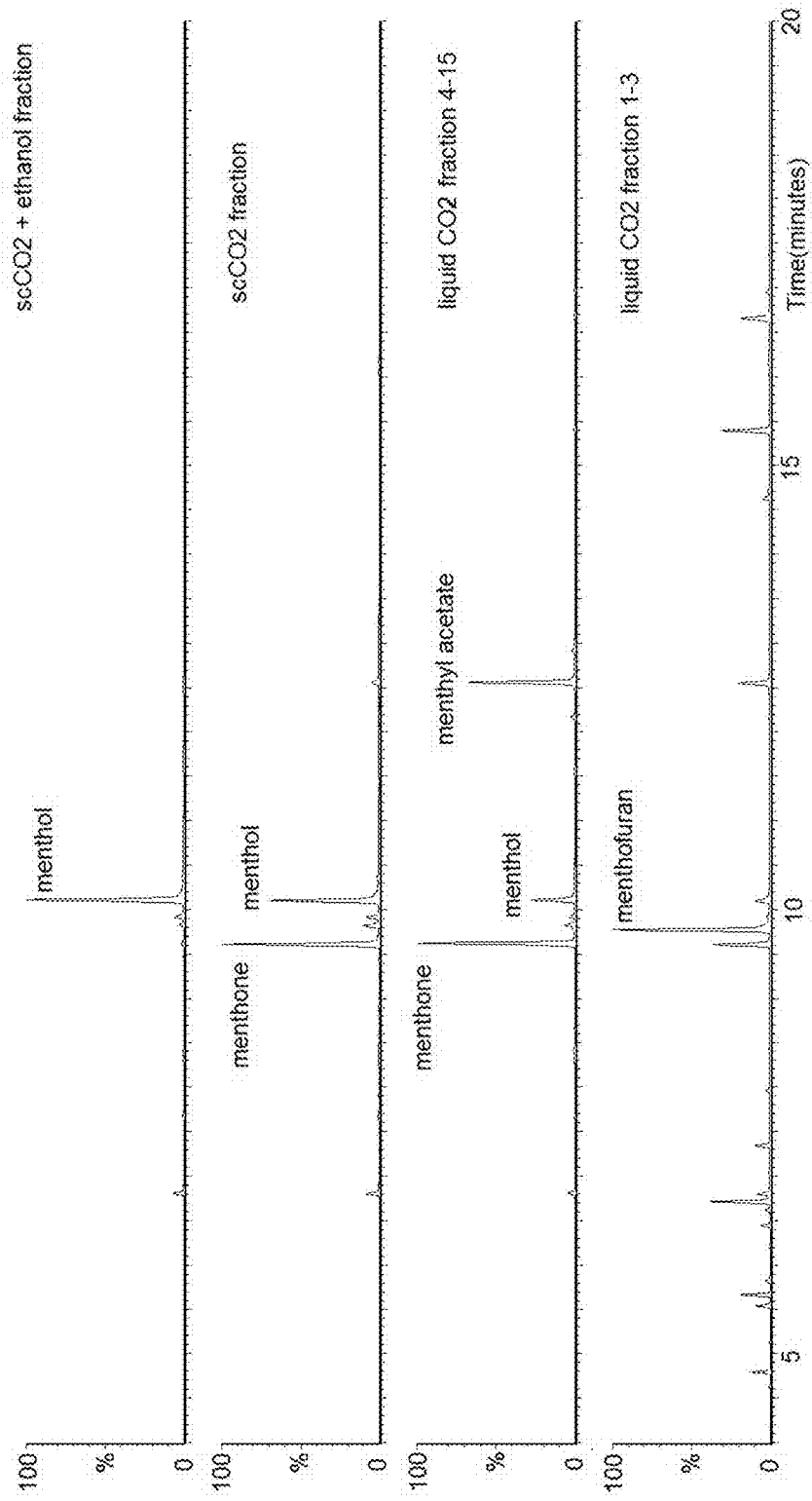
FIG. 11 represents the chromatograms of peppermint oil fractions wherein fractions 1 to 3 are obtained with liquid carbon dioxide at a pressure of 70 bar and a temperature of 5° C., fractions 4 to 15 are obtained with liquid carbon dioxide at a pressure of 70 bar and a temperature of 5° C., and fraction 16 is obtained with supercritical carbon dioxide at a pressure of 300 bar and a temperature of 45° C., and the last fraction is obtained with supercritical carbon dioxide at a pressure of 300 bar and a temperature of 45° C. mixed with 10 vol % of ethanol.

A 3-step sequential extraction of the peppermint oil was carried out respectively with liquid $CO_2$, with supercritical $CO_2$ and with supercritical $CO_2$ mixed with 10 vol % ethanol. It selectively removed this restricted substance. Menthofuran was selectively and completely extracted using liquid $CO_2$ in the first extraction as shown in FIG. 11 thereby leaving the subsequent fractions menthofuran free. The extraction carried out with supercritical CO2 mixed with 10 vol % ethanol gave a clear separation of high menthol fraction.

Figure 12:
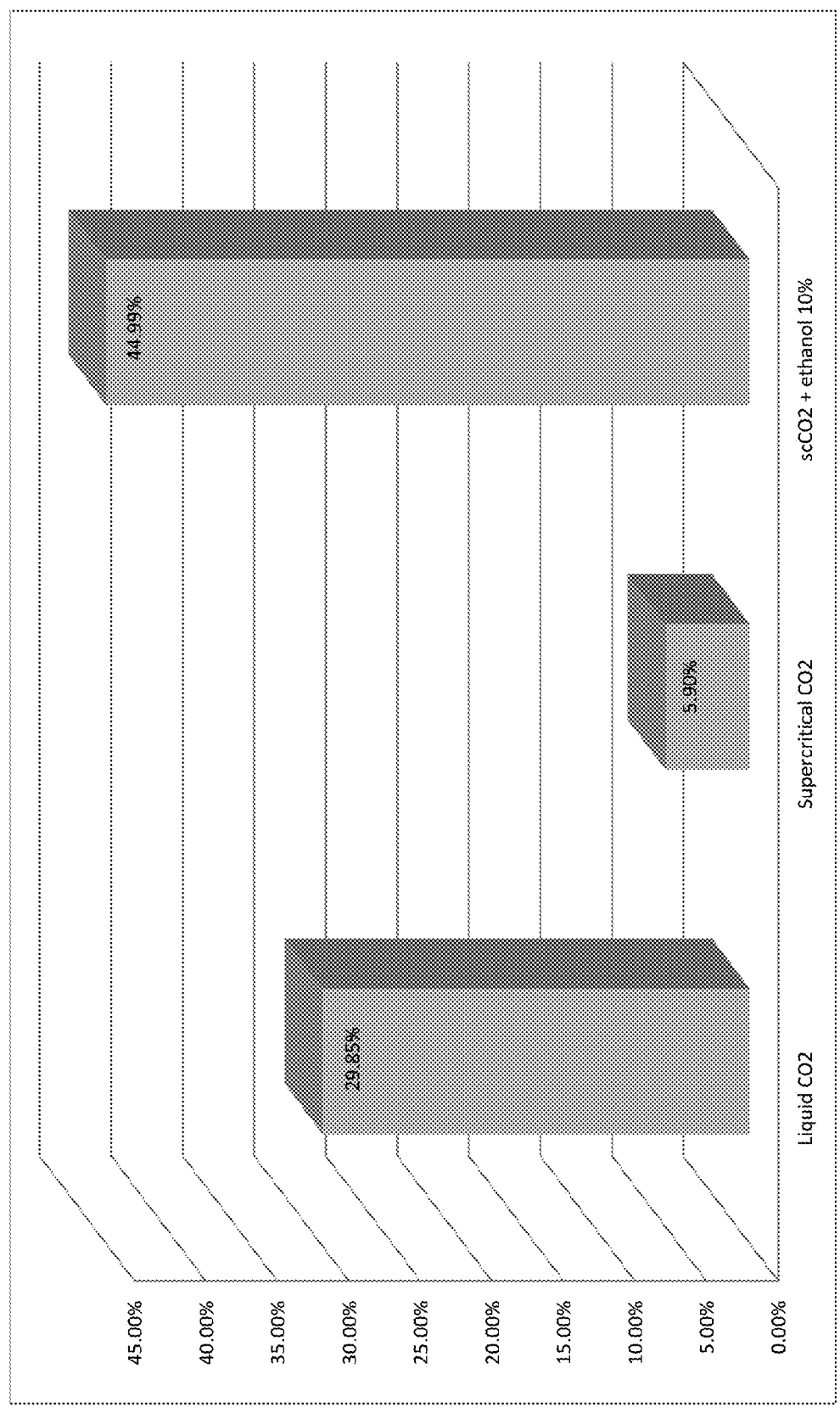
FIG. 12 represents the peppermint oil yields respectively with liquid carbon dioxide, with supercritical carbon dioxide and with a mixture of supercritical carbon dioxide and ethanol.

The yield distribution of extractions carried out respectively with liquid $CO_2$, supercritical $CO_2$ and supercritical $CO_2$ mixed with ethanol are represented in FIG. 12.

Example 4

Figure 13:
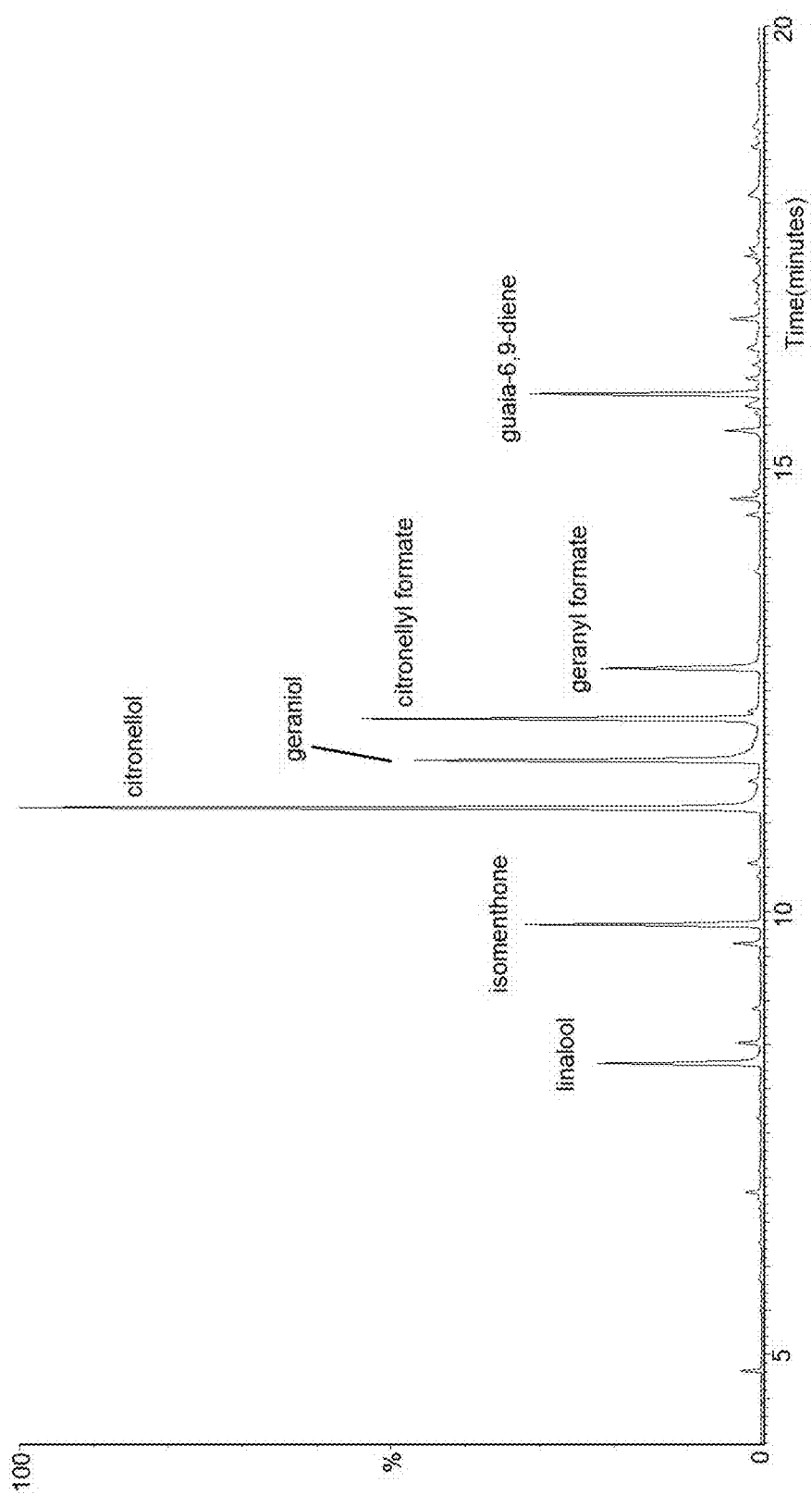
FIG. 13 represents the spectrum of geranium oil (Bourbon).

The silica support Davisil was loaded with 10 wt % of geranium oil. The chemical composition of the starting geranium oil can be seen in FIG. 13. It consists of a mixture of terpene alcohols, hydrocarbons, ketones and esters. Linalool, citronellol and geraniol are key molecules in the geranium oil and are listed as restricted allergens under Directive 2003/15/EC Annex III Part I.

Figure 14:
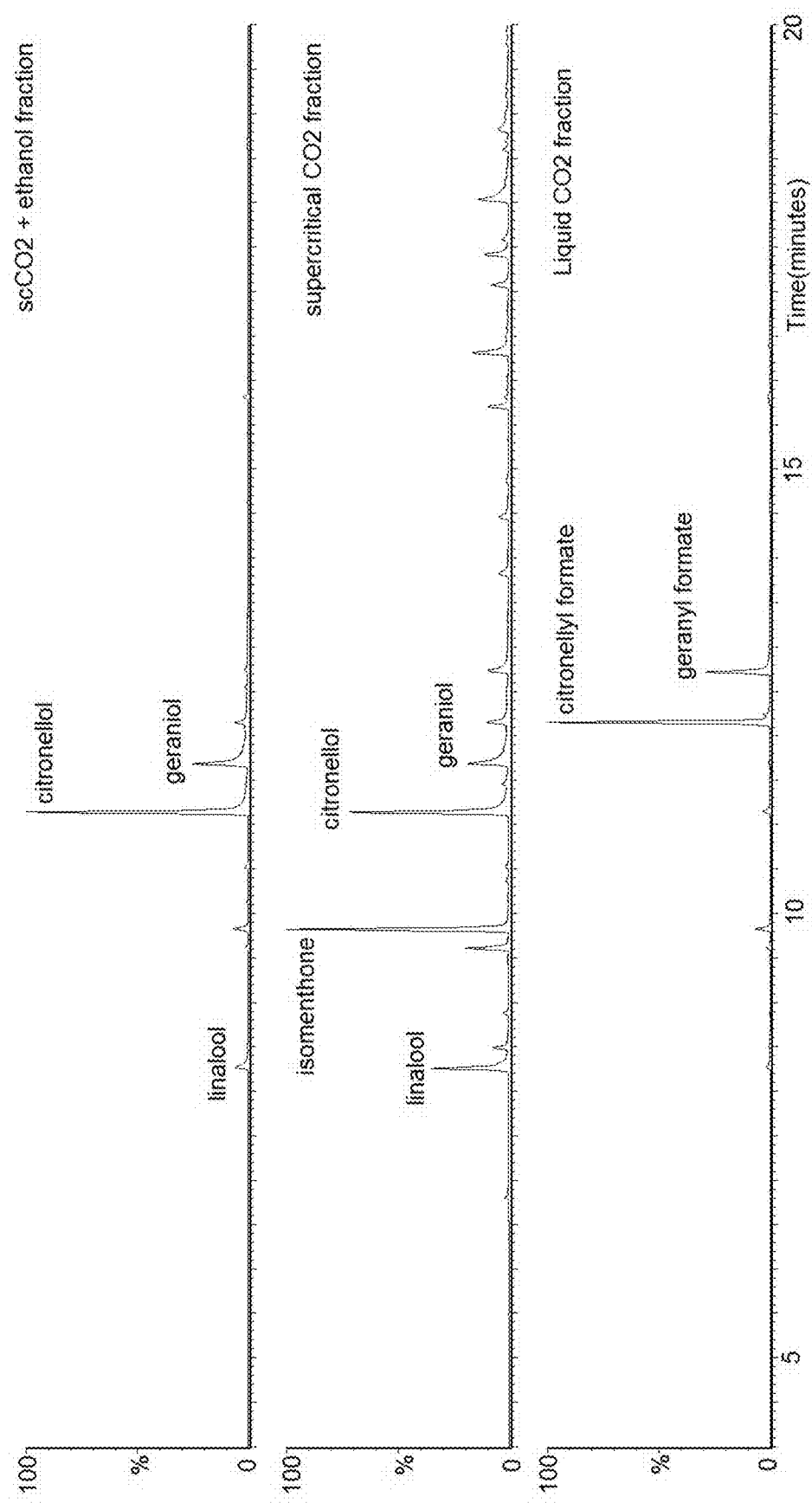
FIG. 14 represents the chromatograms of geranium oil fractions obtained respectively with liquid carbon dioxide at a pressure of 70 bar and a temperature of 5° C., with supercritical carbon dioxide at a pressure of 300 bar and a temperature of 45° C., and with supercritical carbon dioxide at a pressure of 300 bar and a temperature of 45° C. mixed with 10 vol % of ethanol.

A 3-step sequential extraction of the geranium oil was carried out respectively with liquid $CO_2$, with supercritical $CO_2$ and with supercritical $CO_2$ mixed with 10 vol % of ethanol. It was used to selectively extract these three unwanted molecules. The liquid $CO_2$ fraction was completely free of all three allergens and under supercritical $CO_2$ mixed with ethanol, the three allergens were selectively extracted as indicated in FIG. 14.

Figure 15:
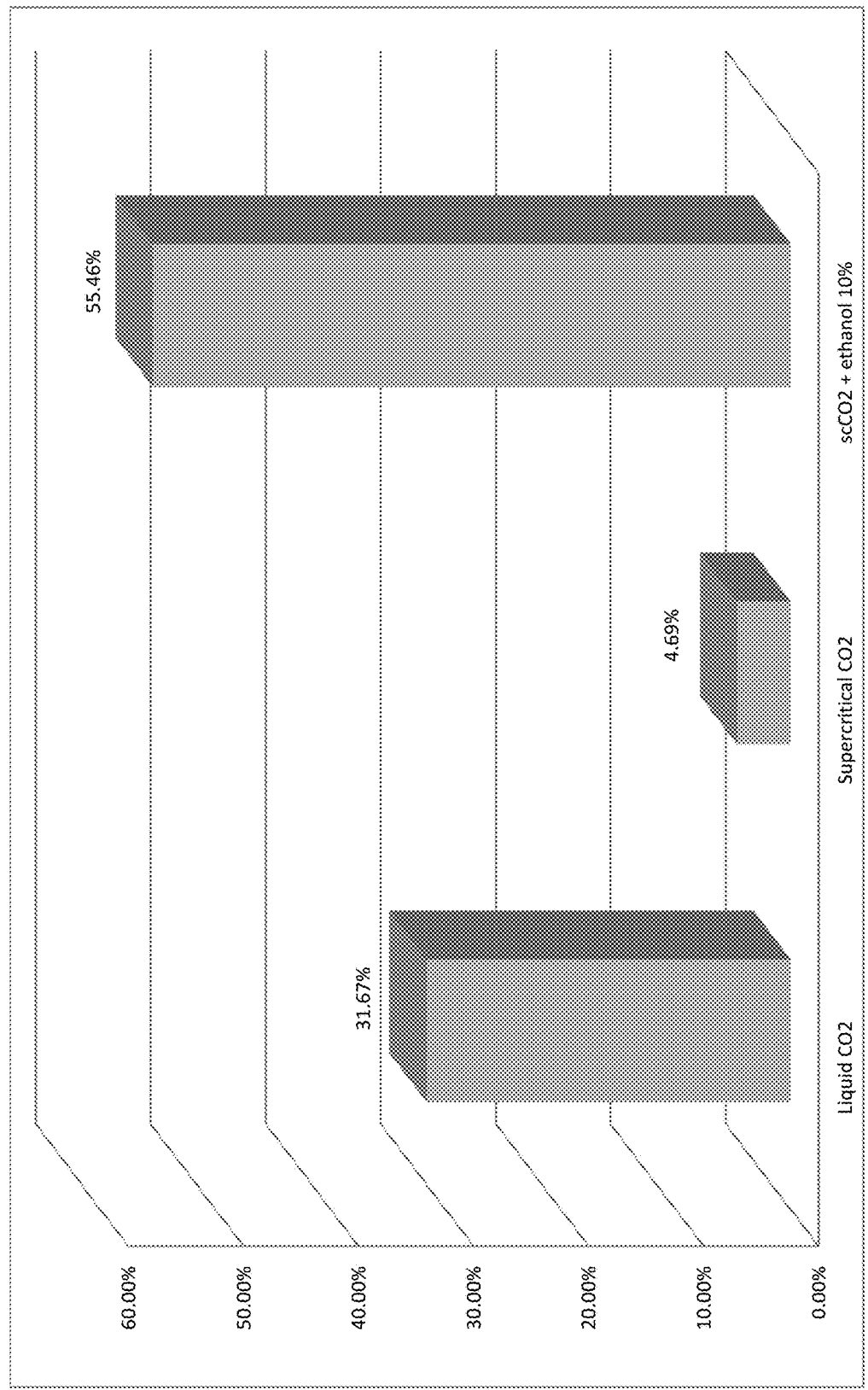
FIG. 15 represents the geranium oil yields respectively with liquid carbon dioxide, with supercritical carbon dioxide and with a mixture of supercritical carbon dioxide and ethanol.

The yield distribution of extractions carried out respectively with liquid $CO_2$, supercritical $CO_2$ and supercritical $CO_2$ mixed with ethanol are represented in FIG. 15.

Example 5

Cold pressed Lemon oil was provided by Sensient Ltd and liquid $CO_2$ was obtained from BOC. The ethanol used was fermentation grade (96%) and obtained from Haymans. Extraction trials were carried out on a Thar extraction rig, using a 1000 ml extractor.

The support was Alumina support Alumina UG-1 provided by Altana, It was prepared as follows: 900 g of mineral support were weighed into a stainless bowl and 100 g of the lemon oil were added using an orbital mixer until a free flowing powder was obtained, free from visible clumps.

Extraction was then carried out as follows: the chillers were set at a temperature of 0° C. for the $CO_2$ pump and at a temperature of 5° C. for the cold trap. 990 g of the supported oil were loaded into the 1000 ml extractor, the powder was fluidised using a long spatula to compact the charge and all powder was removed from the inner rim and threads before closing the extractor. The cylinder inlet pressure was set to a pressure of 50 bar using manual back pressure regulator (MBPR) on $CO_2$ inlet line, the inline heater and extractor 1 were switched off and the separator was heated to a temperature of 40° C.

The first extraction was carried out with liquid $CO_2$ at a temperature of 5° C. and a pressure of 70 bar with a flow rate of 15 g/min. Once pressure had been reached, the separator was adjusted to 15 bar back pressure and samples were collected every 15 minutes, until the fraction weight was below 1 g. When the last sample was collected, the cold trap was drained. After completion, the $CO_2$ pump was switched off, the separator back pressure was released and the separator and cold trap were washed with ethanol. Washings were discarded. The lid was refitted and tightened after thorough drying In the subsequent extraction using supercritical $CO_2$, the automated back pressure regulator (ABPR) was set to 350 bar and the extractor temperature was increased to 45° C. Once temperature was reached, $CO_2$ was turned on at a flow rate of 15 g/minute and once the pressure had been reached the separator was adjusted to 15 bar back pressure and the separator fraction was collected after 60 minutes. When complete the $CO_2$ pump was switched off, the back pressure was released and the separator washed out with ethanol. The washings were discarded, trap volatiles were collected in a separate vial, then the trap was opened and washed out with ethanol and the washings were discarded. The trap and separator were reassembled.

The next extraction was carried out with supercritical $CO_2$ with ethanol as co-solvent, The co-solvent pump was primed, then the valve was slowly opened to allow pressure to equilibrate with supercritical $CO_2$ flow, the conditions used were the same as those of step 2, 350 bar/45° C. $CO_2$ flow was turned on at a flow rate of 13.5 g/minute and once pressure had been reached, the separator was adjusted to 15 bar back pressure and the co-solvent pump was opened at a flow rate of 1.5 g/minute ethanol corresponding to 10 vol %. The samples were collected every hour for 3 hours but the separator and trap were drained every 30 minutes into the same flask. After 3 hours the co-solvent pump was turned off but the $CO_2$ pump was run for another 30 minutes adding this to the last fraction.

At the end of the operation the plant was thoroughly cleaned as follows: the plant was depressurised and all heaters turned off. The contents of the extractor were emptied into a plastic beaker and the extractor was cleaned with a vacuum cleaner. The trap and separator were cleaned with ethanol, and allowed to dry. The plant was then reassembled.

Identification of the compounds was based on calculated Kovats retention index, comparison with library mass spectra (NIST and Adams) and comparison with standard components.

Figure 16:
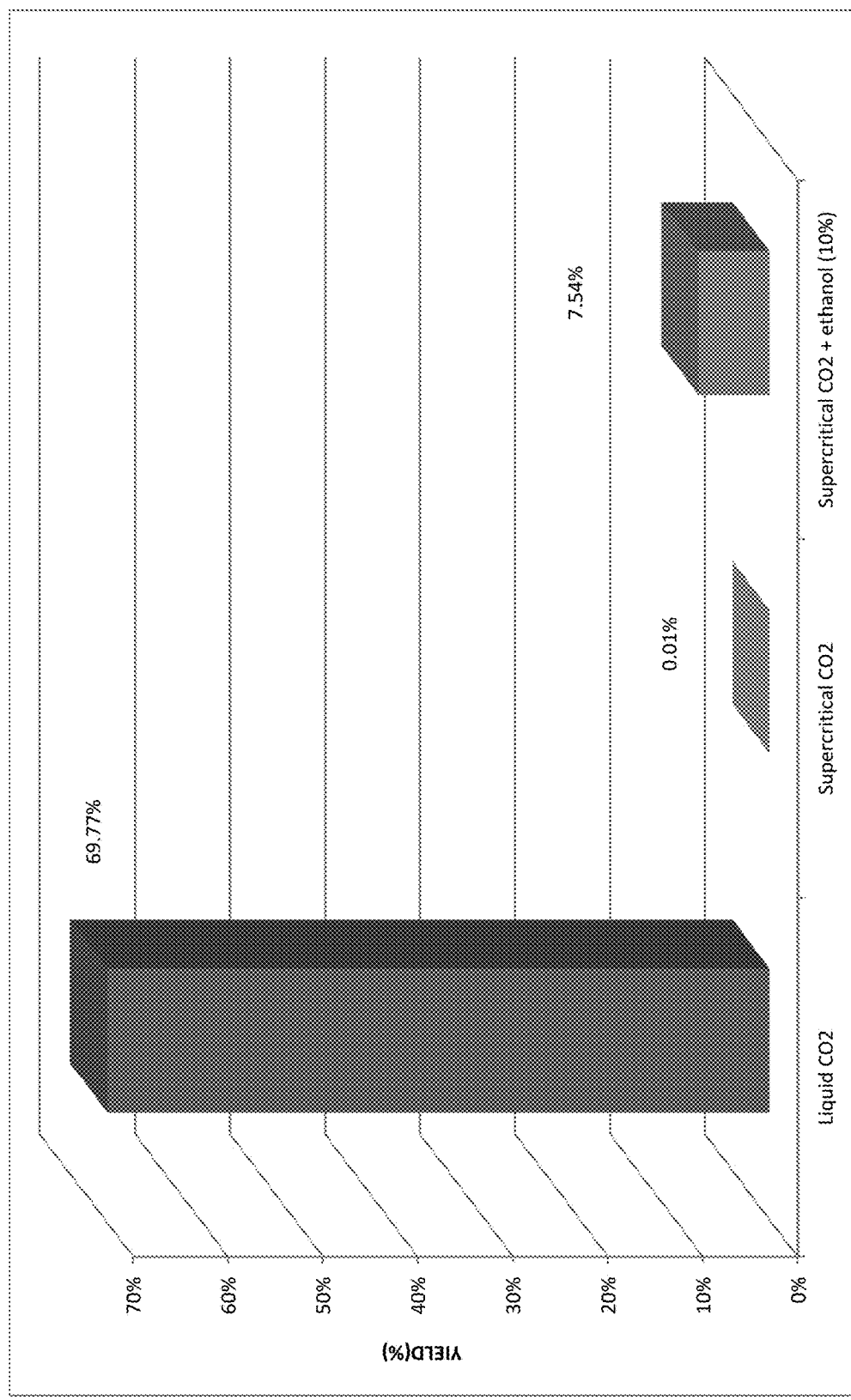
FIG. 16 represents the lemon oil yields on an alumina support respectively with liquid carbon dioxide, supercritical carbon dioxide and supercritical carbon dioxide with ethanol.

The yields in the various $CO_2$ fractions can be seen in FIG. 16. The liquid $CO_2$ fraction is the main fraction and represents 69.77% of the starting oil. In this example the supercritical $CO_2$ fraction is a very small fraction and almost identical to the liquid $CO_2$ in composition indicating a much stronger binding to this support.

Figure 17:
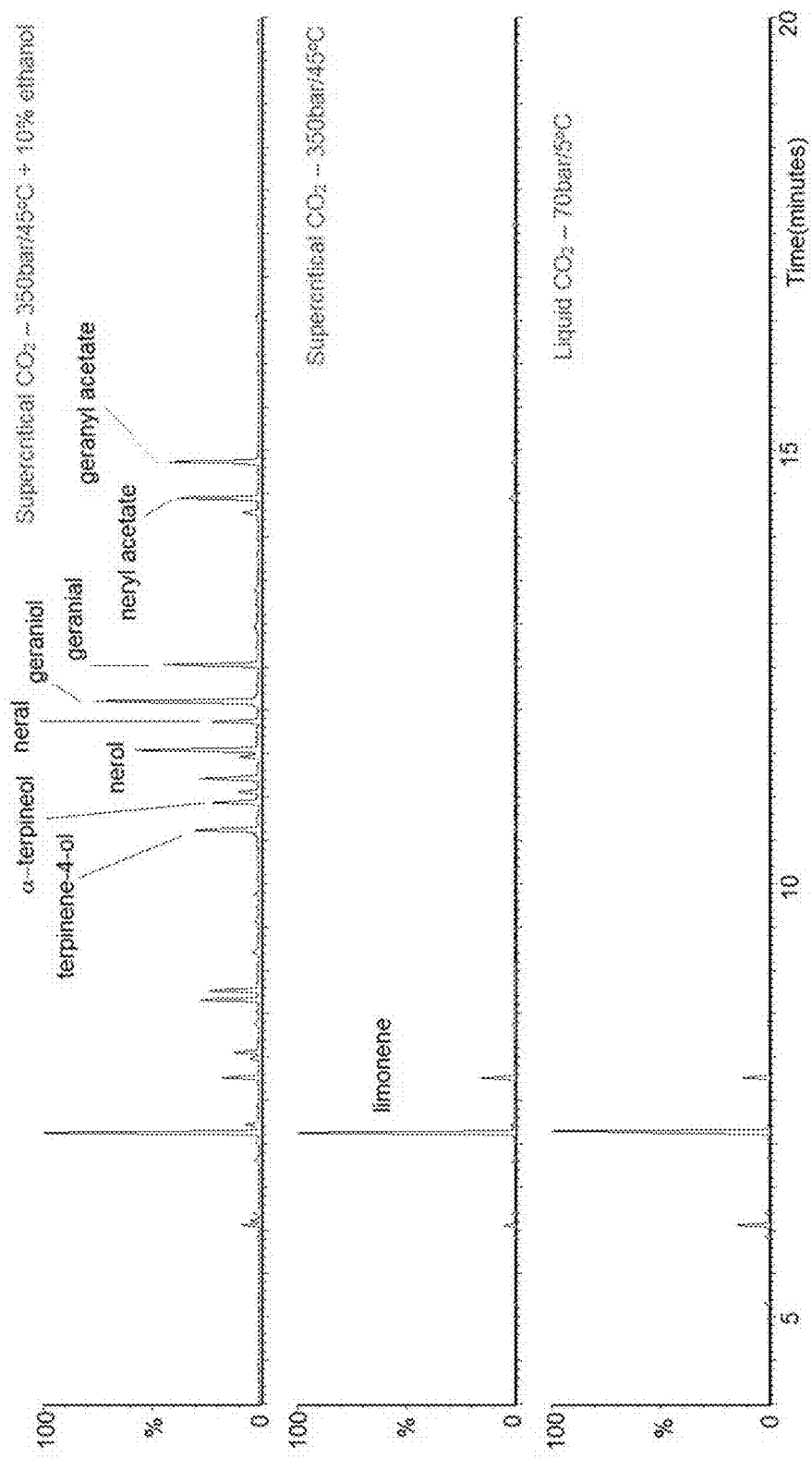
FIG. 17 represents the chromatograms of lemon oil supported on alumina and obtained respectively with liquid carbon dioxide at a pressure of 70 bar and a temperature of 5° C., with supercritical carbon dioxide at a pressure of 350 bar and a temperature of 45° C., and with supercritical carbon dioxide at a pressure of 350 bar and a temperature of 45° C. mixed with 10 vol % of ethanol.

FIG. 17 shows the chromatograms of the liquid $CO_2$ fraction, supercritical $CO_2$ fraction and the supercritical $CO_2$ +ethanol fraction. In the latter fraction both the aldehydes and alcohols are recovered in the same fraction, no formation of DEA is observed.

The importance of the support can be understood by comparing examples 1 and 5 both carried out on lemon oil but respectively with silica and alumina support. The difference in fraction yields is indicative of different binding strengths.

The invention claimed is:

1. A sustainable sequential process for fractionating essential oil into essential oil fractions, each fraction having any one or more of solubility in oil or water, purity, stability and organoleptic quality, said process comprising:
   a) providing an inert adsorbing support having a pore volume ranging between 0.2 and 1 cm$^3$/g, a specific surface area ranging between 50 and 1000 m$^2$/g, an average particle size ranging from 5 nm to 10 mm, a pH ranging between 3 and 11, and a density ranging between 100 and 1500 g/l, and selected to bind polar groups contained in pesticides;
   b) loading essential oil onto the inert adsorbing support of step a) at a loading rate ranging between 1 and 30 mass %, with respect to the total mass of the support and the essential oil;
   c) separating the essential oil into a first fraction with liquid carbon dioxide at a first temperature ranging between −10° C. and 50° C. and a first pressure ranging between 20 bars and 85 bars and a first flow rate ranging between 1 and 25% load/minute until a separation yield for the first fraction falls below 0.1% of a starting mass per hour, and recovering said first fraction;
   d) separating the essential oil into a second fraction with supercritical carbon dioxide at a second temperature of at least 31° C. and a second pressure of at least 72.8 bars and a second flow rate ranging between 1 and 25% load/minute until a separation yield for the second fraction falls below 0.1% of the starting mass per hour, and recovering said second fraction;
   e) separating the essential oil into a new fraction with the supercritical carbon dioxide at a temperature of at least 31° C. and a pressure of at least 72.8 bars and a flow rate ranging between 1 and 25% load/minute combined with a co-solvent at a level ranging between 1 and 25% of the CO$_2$ flow rate, said co-solvent addition being either constant or gradually increasing, until a separation yield for the new fraction falls below 0.1% of the starting mass per hour, and recovering said new fraction;
   f) soaking the loaded inert adsorbing support of step b) after separation step e) in an environmentally friendly solvent; and
   g) decanting or filtering the environmentally friendly solvent from the soaked support of step e) and subsequently evaporating or distilling the environmentally friendly solvent;
said process being characterized in that the support is selected in terms of its volumetric capacity, its surface chemistry and its particle size and the chemical composition of the essential oil to be fractionated.

2. The sustainable sequential process of claim 1 wherein the essential oil is selected from the group consisting of Abietaceae, Acoraceae, Annonaceae, Apiaceae, Betulaceae, Burseraceae, Cupressaceae, Geraniaceae, Labiatae, Lamiaceae, Lauraceae, Myrataceae, Myristicaceae, Orchidaceae, Pinaceae, Piperaceae, Rosaceae, Rubiaceae, Rutaceae, Santalaceae, Umbilliferae, Valerianaceae, Verbenaceae and Zingiberaceae families.

3. The sustainable sequential process of claim 1 wherein the inert adsorbing support of step a) is selected from the group consisting of silica, alumina, montmonrillionite, magnesium silicate, aluminium silicate, zeolite, polystyrene beads, chitosan, polysaccharides or derivatives and/or combinations thereof.

4. The sustainable sequential process of claim 1 wherein the environmentally friendly solvent is selected from the group consisting of water and any organic food grade natural solvent obtained from biological and sustainable sources.

5. The sustainable sequential process of claim 4 wherein the environmentally friendly solvent is selected from the group consisting of ethanol, ethyl lactate, acetone, and from any combination thereof.

6. The sustainable sequential process of claim 1 wherein, in step b), the loading rate of the inert adsorbing support with essential oil ranges between 5 and 20 mass %.

7. The sustainable sequential process of claim 1 wherein the co-solvent is ethanol used in an amount ranging between 5 and 15 vol %.

* * * * *